(12) United States Patent
Gerritse

(10) Patent No.: US 6,340,030 B1
(45) Date of Patent: Jan. 22, 2002

(54) APPARATUS FOR METERING A PLURALITY OF DIFFERENT LIQUID OR PASTY MATERIALS

(75) Inventor: Jan Gerritse, Brummen (NL)

(73) Assignee: Gerritse Beheer B.V. (NL)

( * ) Notice: Subject to any disclaimer, the term of this patent is extended or adjusted under 35 U.S.C. 154(b) by 0 days.

(21) Appl. No.: 09/254,830

(22) PCT Filed: Sep. 1, 1998

(86) PCT No.: PCT/NL98/00497

§ 371 Date: May 28, 1999

§ 102(e) Date: May 28, 1999

(87) PCT Pub. No.: WO99/11474

PCT Pub. Date: Mar. 11, 1999

(30) Foreign Application Priority Data

Sep. 2, 1997 (NL) .............................................. 1006911

(51) Int. Cl.$^7$ ................................................ B65B 3/28
(52) U.S. Cl. .................... 137/403; 141/83; 141/100; 141/104; 141/156; 141/196; 177/53; 177/54; 177/60; 177/84; 177/89; 177/116
(58) Field of Search ................................ 137/386, 403, 137/1; 141/83, 100, 104, 128, 129, 283, 284, 156, 196; 222/55, 57, 58, 63, 77, 108, 144.5, 164, 166; 177/53, 54, 60, 84, 89, 116, 119, 122, 123

(56) References Cited

U.S. PATENT DOCUMENTS

| 4,526,215 A | 7/1985 | Harrison et al. | 141/83 |
| 4,585,148 A | 4/1986 | Ito | 222/77 |
| 5,464,047 A * | 11/1995 | Muscara | 141/83 |
| 5,740,843 A * | 4/1998 | Burkart | 141/83 |
| 5,883,336 A * | 3/1999 | Jones | 141/83 |

FOREIGN PATENT DOCUMENTS

| DE | 3201221 | 7/1983 |
| EP | 0283137 | 9/1988 |
| EP | 0654298 | 5/1995 |
| EP | 0693310 | 1/1996 |
| WO | 962889 | 9/1996 |

* cited by examiner

Primary Examiner—George L. Walton
(74) Attorney, Agent, or Firm—Webb Ziesenheim Logsdon Orkin & Hanson, P.C.

(57) ABSTRACT

An apparatus for metering a plurality of different liquid or pasty masses to a receiving container including:

first support for supporting containers for the masses in fixed positions;

a fixedly disposed annular frame bearing a number of dispensing nozzles controllable by a fixedly disposed control device and each individually connectable to said containers via respective conduits;

a second support controllable by the control device for supporting a receiving container such that this receiving container is displaceable in an annular path corresponding with the annular form of the frame and can be placed temporarily beneath a chosen dispensing nozzle for receiving mass dispensed by this dispensing nozzle;

a weighing device on which a receiving container can be placed, which weighing device can supply weight signals to the control device;

wherein the weighing device is disposed fixedly and supports the second support.

18 Claims, 7 Drawing Sheets

APPARATUS FOR METERING A PLURALITY OF DIFFERENT LIQUID OR PASTY MATERIALS

BACKGROUND OF THE INVENTION

FIELD OF THE INVENTION

The invention relates to an apparatus for metering a plurality of different liquid or pasty masses. Such an apparatus is known in diverse embodiments and is also designated as colour kitchen. Said masses are in that case paint, ink, thickening or thinning agents and the like. The masses have to be supplied in predetermined quantities, at least mutual ratios, to a receiving container. This receiving container, for instance a bucket, a can or the like, must be filled with a determined quantity of mixture. For this purpose predetermined quantities of selected masses are admitted successively into the receiving container. As soon as the receiving container is filled with all desired components in the desired quantities, a subsequent receiving container is filled in comparable manner with the constituent components. In this subsequent and other cycles the composition can differ in accordance with the composition of the finally required mixture.

After the constituent components have been placed in the receiving container, homogenization generally takes place by means of known homogenizing processes, in particular stirring and shaking.

An apparatus of said type comprises provisions for supporting containers for the masses for metering. These containers can be connected by means of flexible hoses or fixed conduits to dispensing nozzles for individual dosing in each case of a determined quantity of a relevant mass. A placed receiving container and all relevant dispensing nozzles must be mutually movable such that each dispensing nozzle can dispense mass to the receiving container. It is known for instances to fixedly dispose a container on scales and to place the relevant dispensing nozzle in each case above the receiving container by means of a movable frame.

Alternatively, a frame supporting the dispensing nozzles can be fixedly disposed, wherein the scales supporting the receiving container are movable thereunder.

The scales are of importance for dispensing a determined mass in the correct quantity. The control of the dispensing nozzles therefore takes place on the basis of this mass measurement. It is possible in principle to suffice with a mass or weight difference measurement.

In the case where the dispensing nozzles are movable relative to the storage container, use must be made of flexible conduits. The great drawback of flexible conduits is that they are subject to undesirable mechanical loads, in particular torsion, which can greatly reduce the lifespan and can cause malfunctions. Hoses are further subject to ageing. This is the reason why an embodiment is usually recommended with a fixed spatial relation between the dispensing nozzles and the storage containers, in which case fixed conduits of for instance plastic or metal can be used. In that case the scales with a receiving container thereon must be arranged displaceably relative to the nozzles. Such an arrangement does however have the drawback that the conduits connecting the electronically operating weighing device to central, fixedly disposed control means are likewise subjected to mechanical influences.

This mechanical influence can remain limited by making use of a horizontal linear x or XY mobility within limited boundaries. Such an arrangement has the drawback however that it takes a relatively large amount of time to go from one side of an array to the other, which may nevertheless occur during operation of the apparatus. Recommended in this respect is an annular arrangement of the dispensing nozzles and a corresponding annular path in which the weighing device with a receiving container thereon can move.

If desired, there may even be a movement predominantly in one direction along such a path. This is not possible however without specific measures, since the conduits providing the necessary supply of electrical energy to the weighing device and the information cables are otherwise placed under torsional stress.

It is an object of the invention to provide an apparatus which obviates all drawbacks of said techniques and is not afflicted with the limitations of the known art.

SUMMARY OF THE INVENTION

In respect of the above, the invention provides an apparatus for metering a plurality of different liquid or pasty masses such as paint, ink, thickening or thinning agents and the like to a receiving container, for instance a bucket or a can, which apparatus may include:

first supporting means for supporting containers for the masses in fixed positions;

a fixedly disposed annular frame bearing a number of dispensing nozzles controllable by fixedly disposed central control means (PLC, PC) and each individually connectable to said containers via respective conduits;

second supporting means controllable by said control means for supporting a receiving container such that this receiving container is displaceable in an annular path corresponding with the annular form of the frame and can be placed temporarily beneath a chosen dispensing nozzle for receiving mass dispensed by this dispensing nozzle;

a weighing device on which a receiving container can be placed, which weighing device can supply signals to the control means which are representative for the weight of the receiving container with its content or the change in that weight;

which control means are adjustable, for instance by means of program control, for dispensing different masses in determined quantities to successive receiving containers, for instance in successive cycles, in order to make successive mixtures of respective chosen compositions;

wherein the weighing device is disposed fixedly, is connected to the control means via cable means and supports the second supporting means, and wherein the second supporting means are rotatably drivable round a vertical axis by means of a drive device co-acting with the second supporting means such that when a weighing is performed the drive is inactive such that no forces which can influence the weighing are exerted on these second supporting means, for instance the drive is substantially disengaged from the second supporting means.

Attention is drawn in this respect to the fact that an apparatus is known from applicant's earlier non-prepublished Netherlands patent application NL-1006685 of Jul. 30, 1997 wherein the weighing device is supported by the second supporting means. Since the weighing device herein rotates, special provisions are necessary to prevent unintended torsion of the cable means which connect the weighing device to central control means. Since the weighing device is disposed fixedly in the apparatus according to the present invention, there is no question of cables subject to torsion.

The structure according to the present invention is therefore simpler than that according to the above stated Netherlands patent application. The apparatus is suitable for metering liquid or pasty masses into relatively small containers. The structure according to the invention prevents any vertical force being exerted by the drive means on the scales. Such a vertical force must be avoided since it would influence the measurement accuracy.

Driving takes place in the horizontal plane, wherein the input and the output parts of the drive element lie mutually in line.

A specific embodiment of the apparatus according to the invention has the special feature that the drive comprises at least one drive cylinder of pneumatic, hydraulic or electrical type.

A specific embodiment has the special feature that the drive comprises at least two cylinders connected mechanically in series to each other, the respective strokes of which correspond with respectively ½, ¼, ⅛, etc. of the periphery of the drive drum. This embodiment enables rapid adjustment of the angular position of the second supporting means through respectively ±180°, ±90°, ±45°, etc. It will be apparent that any discrete angular position can hereby be realized, while the resolution is determined by the cylinder with the smallest stroke.

The invention will now be the elucidated with reference to the annexed drawings.

DETAILED DESCRIPTION OF THE PREFERRED EMBODIMENTS

Figure 1:
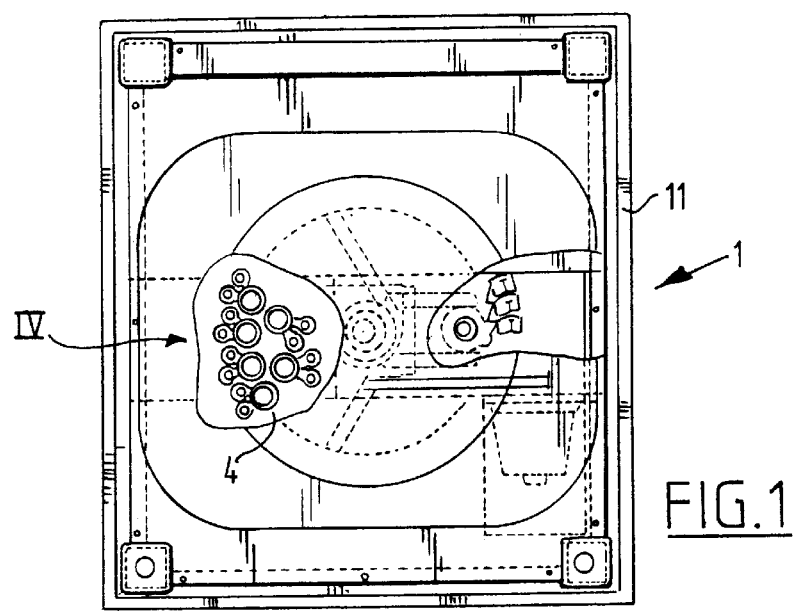
FIG. 1 shows a partly broken away top view of an apparatus according to NL-1006685 such that a part of the interior is visible.
Figure 2:
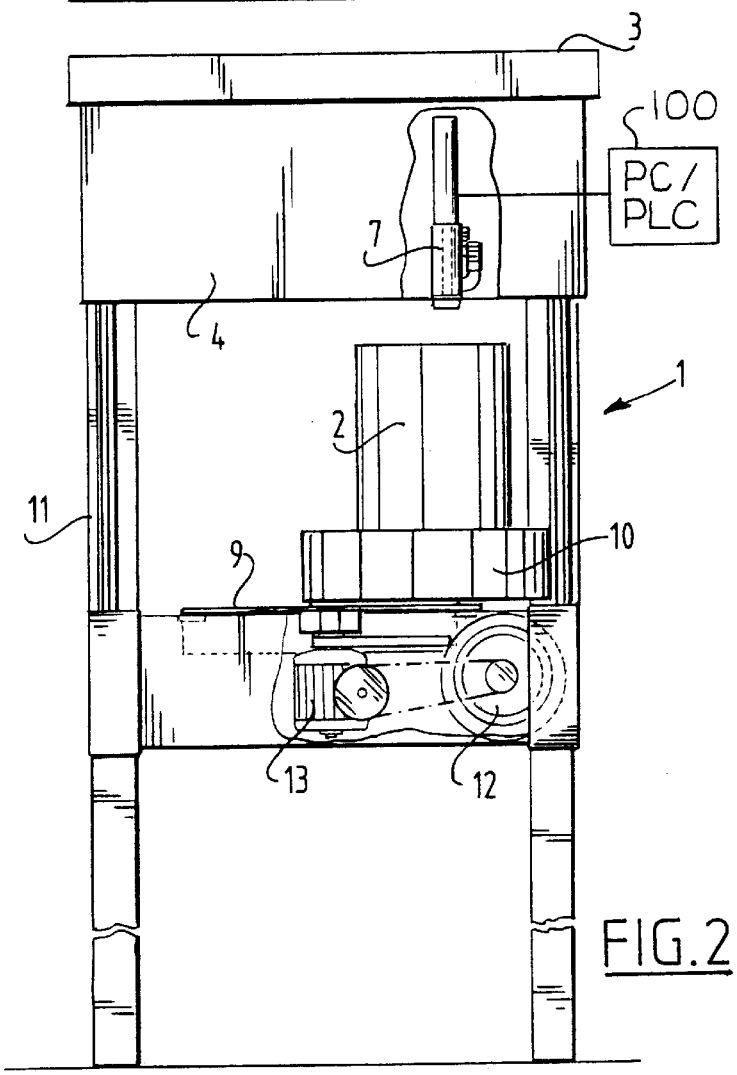
FIG. 2 shows a partly broken away front view of the apparatus of FIG. 1.
Figure 3:
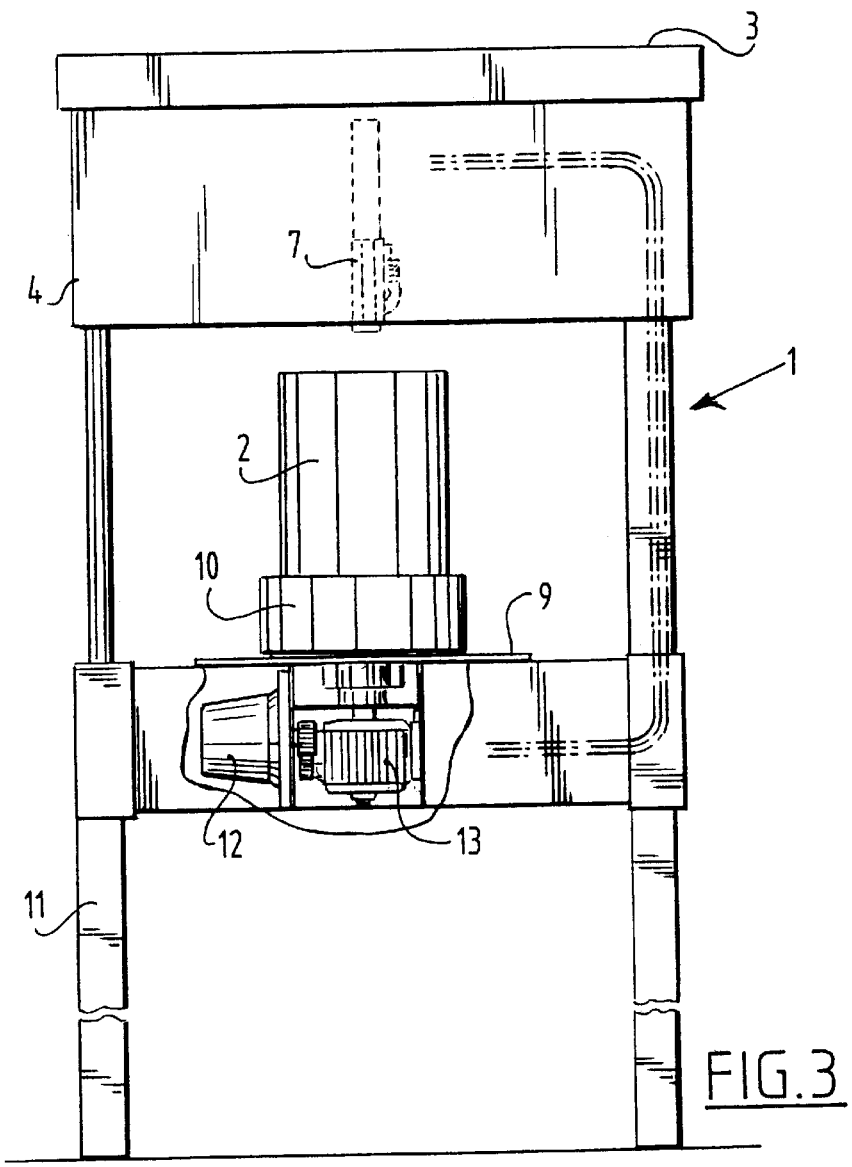
FIG. 3 shows a partly broken away side view of the apparatus of FIG. 1.

FIGS. 1, 2 and 3 show an apparatus 1 for metering liquid or pasty masses to a receiving container 2; on top of the apparatus 1 containers for the masses can be placed in fixed positions on a support platform 3.

Figure 4:
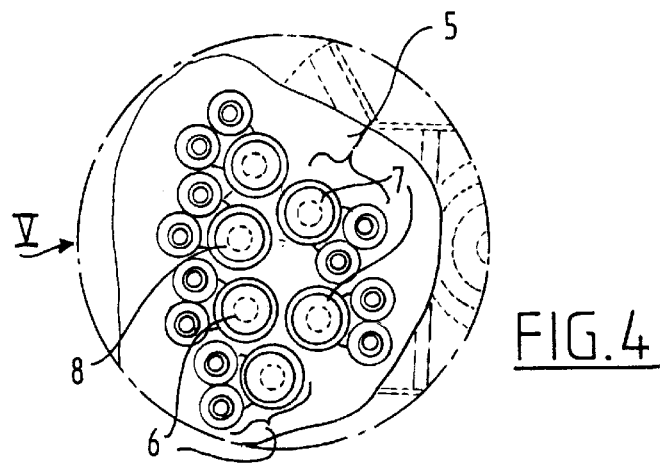
FIG. 4 shows the detail IV in FIG. 1 on enlarged scale.
Figure 5:
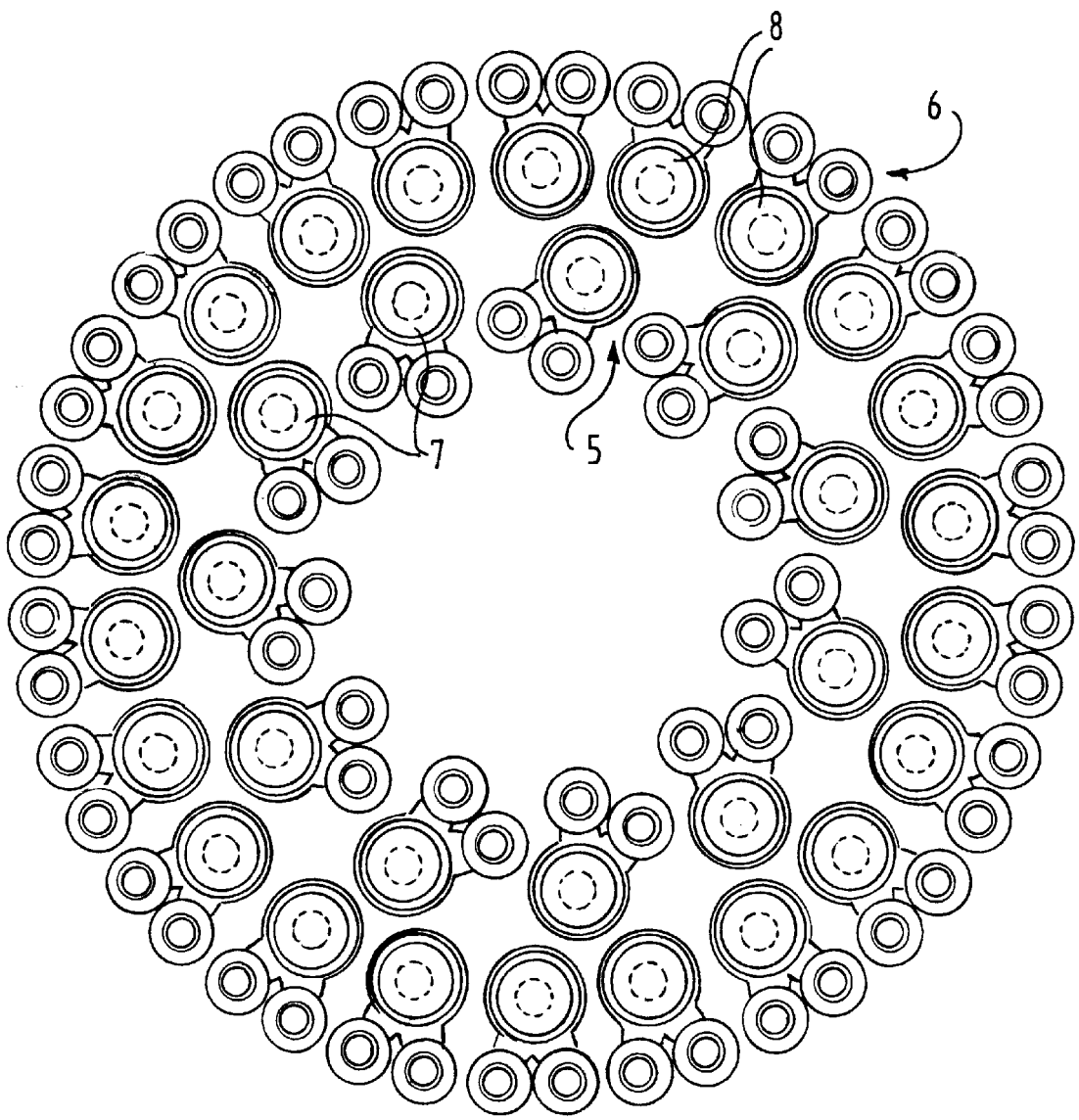
FIG. 5 shows the top view according to FIG. 4 of the total arrangement of all dispensing nozzles.

The apparatus further comprises a fixedly disposed frame 4 which bears a number of dispensing nozzles controllable by fixedly disposed central control means 100 such as a PC or PLC. These nozzles are ordered in a respective inner ring 5 and outer ring 6. Inner ring 5 comprises eleven dispensing nozzles, all designated with 7, while outer ring 6 comprises twenty-two dispensing nozzles 8. It is noted that each dispensing nozzle is connected to two conduits, i.e., a supply conduit and a return conduit. It is generally known and usual that mass flows permanently through dispensing nozzles of this so as not to incur any problems with fouling, caking and lump-forming in the case of prolonged standstill. The dispensing openings are shown particularly clear in FIGS. 4 and 5 as the central zones of the relatively large annular structures.

The apparatus 1 further comprises second supporting means in the form of a rotatable support platform 9 which bears a weighing device 10. With this configuration receiving container 2 can proceed through a path such that it can receive mass from any of the dispensing nozzles 7, 8 of both the inner ring 5 and the outer ring 6.

The weighing device is connected to a power source and the control means 100 for receiving power supply and for generating information to the control means 100. This connection is embodied such that the cable means required for this purpose are not subjected to any torsion in this embodiment, irrespective of the angular position of support platform 9. This important aspect of the invention will be further elucidated with reference of FIG. 6.

Support platform 9 is rotatable by means of a motor 12 with transmission means 13 connected thereto. Within the scope of the invention it is not necessary to discuss the manner in which the control of the motor and optional transmission means takes place such that receiving container 2 is always carried to the correct location and is held still there. Tacho means can for instance co-act with support platform 9.

Not considered at all is the manner in which dispensing nozzles 7, 8 are controlled. It is generally known that use can be made for this purpose of electrically, pneumatically or hydraulically controllable valves. This aspect does not however form part of the invention.

Figure 6:
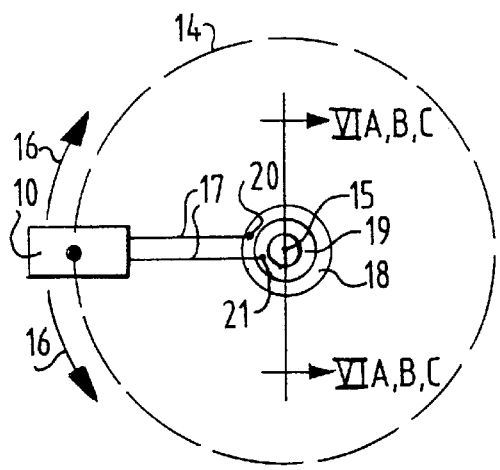
FIG. 6 is a schematic representation of an embodiment with fixed orientation relative to the centre of the path.

FIG. 6 shows the annular path 14 in which weighing device 10 can move as according to arrows 16. Owing to the fixed arrangement of weighing device 10 on support platform 9, it has a fixed orientation relative to the centre 15 of the path 14. Designated symbolically are two cables 17, which connect weighing device 10 to respective split rings 18 and 19 via respective slide contacts 20 and 21.

Figure 6A:
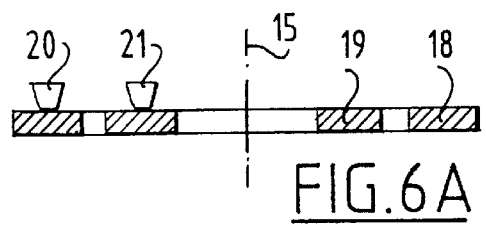
FIG. 6A shows a cross-section through the central transmission device with slide contacts.

FIG. 6A shows the relevant configuration.

Figure 6B:
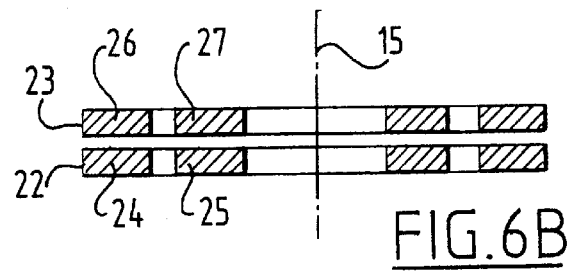
FIG. 6B shows a view corresponding with FIG. 6A of capacitive optical transmission.

FIG. 6B shows an alternative. In this embodiment there are two possibilities. A lower structure 22 and an upper structure 23 mutually co-act for the electrical transfer of energy and signals. In a practical embodiment the lower structure, which is fixedly disposed, comprises an outer ring 24 and an inner ring 25, while the upper structure has rings co-acting therewith, i.e. an outer ring 26 and an inner ring 27. The upper structure is connected to support platform 9 and therefore are rotatably movable. Rings 24, 25, 26, 27 can be pairs of capacitor plates co-acting for capacitive transfer, particularly while making use of high frequencies. Use can also be made of light-emitting junctions or semiconductor diodes and light-sensitive receptors co-acting therewith. It is also possible to transfer energy as well as analog or digital information with such structures.

Figure 6C:
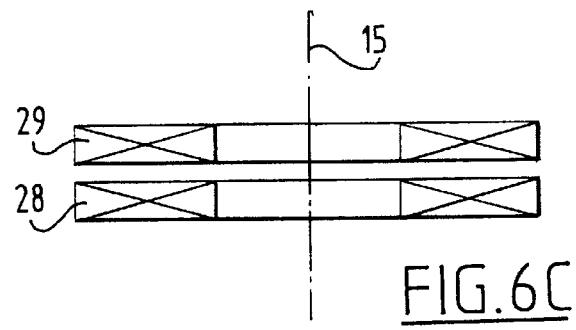
FIG. 6C shows a schematic view corresponding with FIG. 6A of an inductive transmission.

FIG. 6C shows a lower structure 28 and an upper structure 29 which comprise respective, mutually co-acting annular coils for inductive transfer of power supply, for instance with a frequency of 10 kHz and the transfer in reverse direction of information, for instance information with a frequency content considerably above said power supply frequency.

Figure 7:
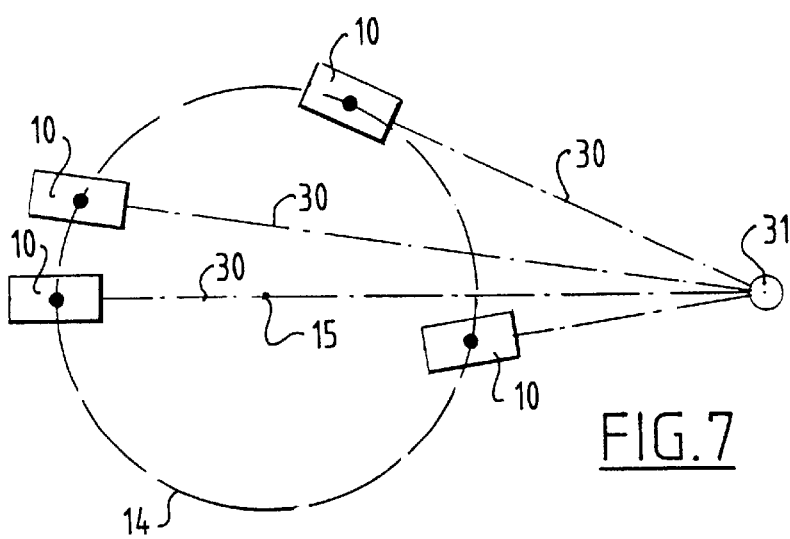
FIG. 7 shows an embodiment with fixed orientation relative to a fixed point outside the circular path.

FIG. 7 shows an embodiment wherein a symbolically designated arm 30 of variable length, for instance an arm consisting of telescopically co-acting parts, is connected non-rotatingly on one side to weighing device 10 and connected pivotally on the other side to a hinge 31. The structure shown in FIG. 7 ensures that the net rotation of weighing device 10 amounts to zero after covering a path of 360°.

Figure 8:
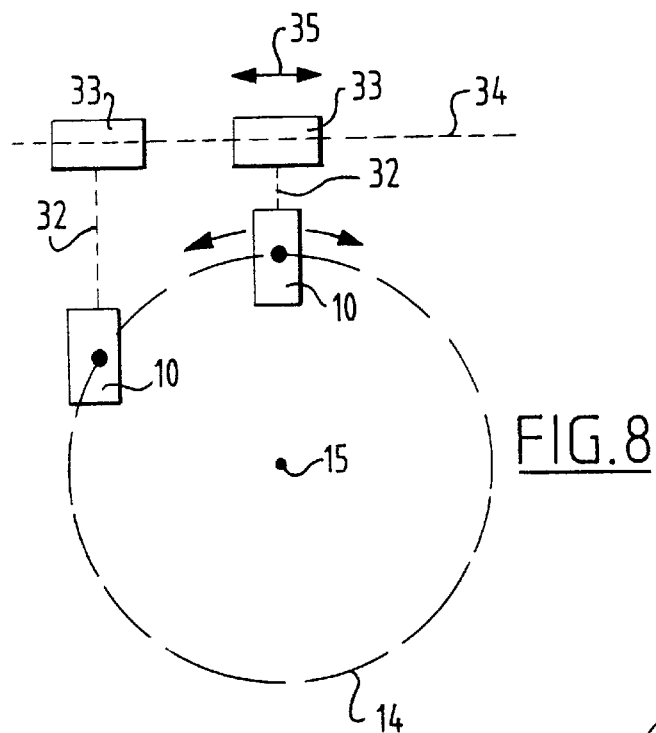
FIG. 8 is a schematic representation of an embodiment with invariable orientation making use of mechanical XY guide means.

FIG. 8 shows a variant wherein via an arm 32 of variable length the weighing device 10 is movable with fixed orientation relative to a carriage 33, which is movable reciprocally as according to arrow 35 along a straight guide 34. With this configuration, as shown in FIG. 8, the orientation of weighing device 10 is kept invariable and independent of the position on the path 14 of weighing device 10.

Figure 9:
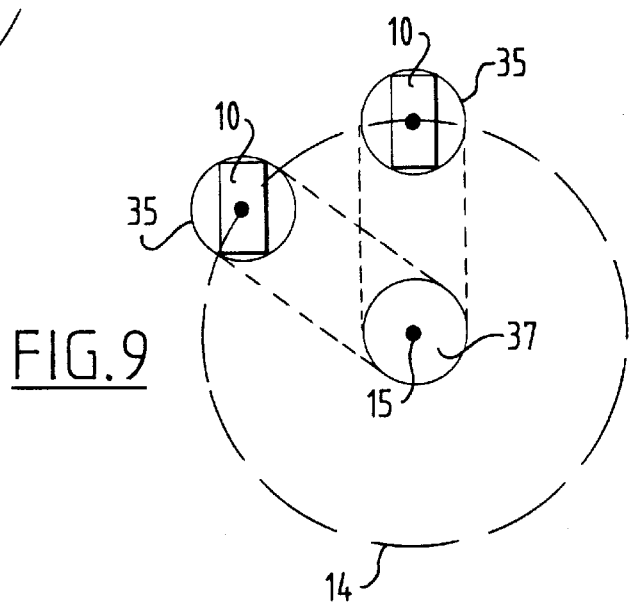
FIG. 9 shows a variant with toothed wheels and a chain or toothed belt.
Figure 10:
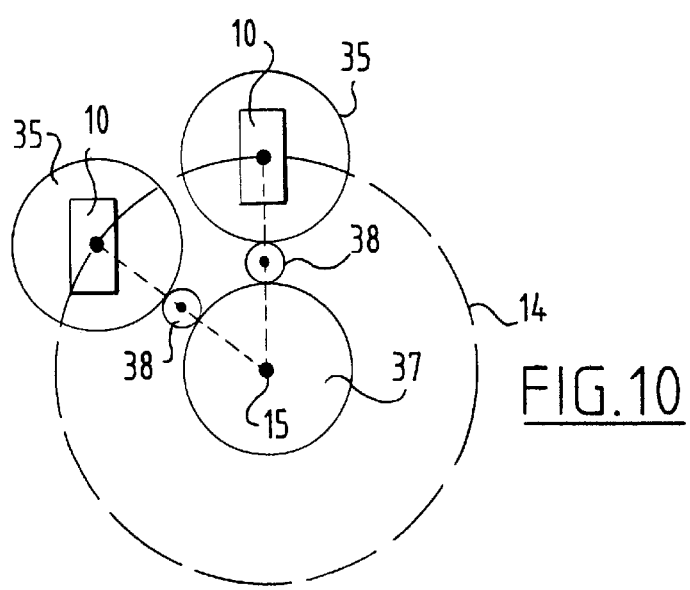
FIG. 10 shows a variant with toothed wheels.

FIGS. 9 and 10 show variants which realize the same effect with other means.

In the embodiment according to FIG. 9, weighing device 10 is supported by a first toothed wheel 35 which is rotatable relative to path 14 and which co-acts via a toothed belt or chain 36 with a fixedly disposed central second toothed wheel 37. Toothed wheels 35 and 37 are identical. The orientation of weighing device 10 is thus kept invariable over the whole path 14.

The configuration of FIG. 10 differs from the configuration of FIG. 9 insofar as toothed wheels 35 and 37 are not mutually coupled with a toothed belt or chain 36 but via a third toothed wheel 38 which is disposed such that the centres of toothed wheels 35, 38, 37 always lie on a collective radial straight line. FIG. 10 shows symbolically that the dimensions of toothed wheel 38 are irrelevant. Of essential importance however is that toothed wheels 37 and 35 are identical.

It is noted that transmission means other than those according to FIGS. 9 and 10 are also possible so as to ensure that the orientation of weighing device 10 is invariable.

Figure 11B:
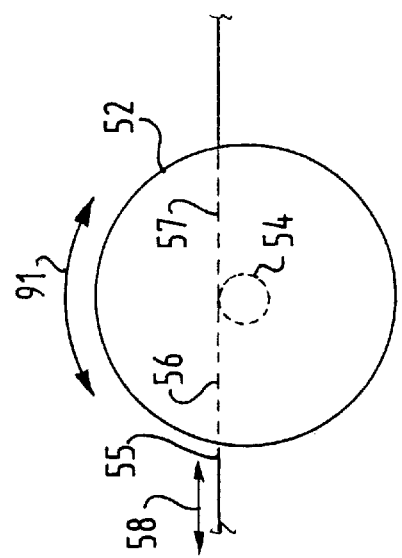
FIG. 11b shows a highly schematic top view of the detail A—A in FIG. 11.
Figure 11A:
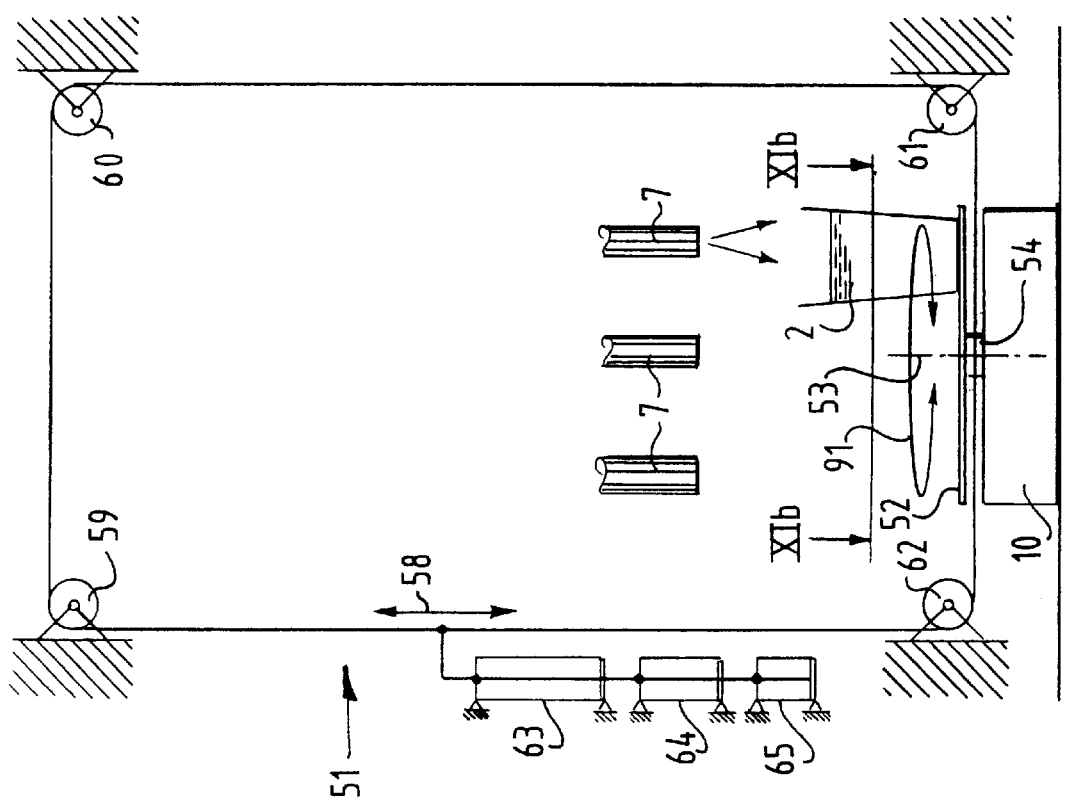
FIG. 11a shows a schematic side view of an apparatus according to the invention.

FIGS. 1–10 all relate to the apparatus according to NL-1006685. FIGS. 11a and 11b relate to the structure according to the present invention. Reference is made to FIGS. 1, 2, 3, 4 and 5 for elucidation of the deployment of the dispensing nozzles.

FIG. 11a shows an apparatus 51 according to the invention. At variance with the embodiments of FIGS. 1–10, the weighing device is disposed fixedly in apparatus 51. It supports a platform 52 which is rotatably drivable via a vertical rotation axis 53. For this purpose platform 52 is rigidly coupled to a drive drum 54. This is mounted for rotation round axis 53, for instance by a central pin, optionally in combination with further bearings.

As shown in FIG. 11b, a tensioned cord 55 is trained around drive drum 54 such that the one part 56 and the other part 57 of drive element 55 (e.g., cord) lie precisely in line with each other. Tensile forces can be exerted in both directions on drive element 55 by dirve means to be described herein below. These forces are indicated with arrows 58. Cord 55 is of the endless type and, as is drawn in the embodiment of FIG. 11a, is guided in an endless path by four deflecting rollers 59, 60, 61, 62. Driving takes place via a drive device comprising three cylinders 63, 64, 65, respectively. These have respectively a stroke of ½, ¼, and ⅛ of the periphery of the drive drum 54. Since the cylinders are mutually connected in series and individually controllable via the control means 100, platform 52 can be placed by suitable control of cylinders 63, 63, 65 in any discrete angular position with mutual distances of 45°.

Figure 12:
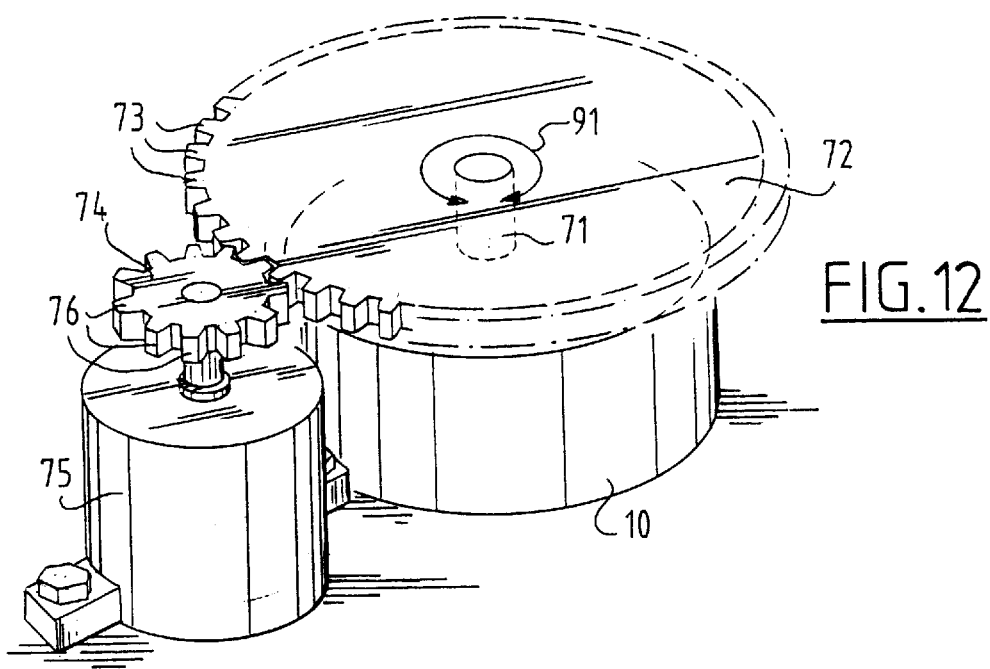
FIG. 12 is a partly transparent perspective view of another embodiment of the invention.

FIG. 12 shows a weighing device 10 with a weighing platform 72 supported rotatably by central shaft 71. Weighing platform 72 bears on its periphery a toothing 73 and thus has the character of a toothed wheel. Co-acting with this weighing platform or toothed wheel 72 is a drive toothed wheel 74 which can be driven by a motor 75, for instance a stepping motor, which is disposed fixedly relative to weighing device 10. When a weighing is performed, wherein one or more containers are placed on weighing platform 72, the driving co-action between toothed wheels 74 and 72 must be prevented from having any effect on the weighing. Toothed wheel or weighing platform 72 must be substantially freely movable in vertical direction in order to carry out weighing. Drive toothed wheel 74 could have a disruptive influence here. In this respect the metering device is embodied in the embodiment according to FIG. 12 such that during performing of a weighing the drive 74, 75 is inactive and toothed wheels 72, 74 are mutually disengaged. In this way, no force which may influence the weighing can be exerted on weighing platform 72. Attention is drawn to the fact that with a view to a complete disengagement the teeth 73 of weighing platform 72 and the teeth 76 of toothed wheel 74 fit together with a slight gap. Hereby achieved in addition to driving operation of motor 75 is that the freely rotatable weighing platform 72 can be moved freely up and downward during a weighing.

The problem described occurs in the case of FIG. 12 when the motor and the weighing device 10 are fixedly disposed relative to each other.

Figure 13:
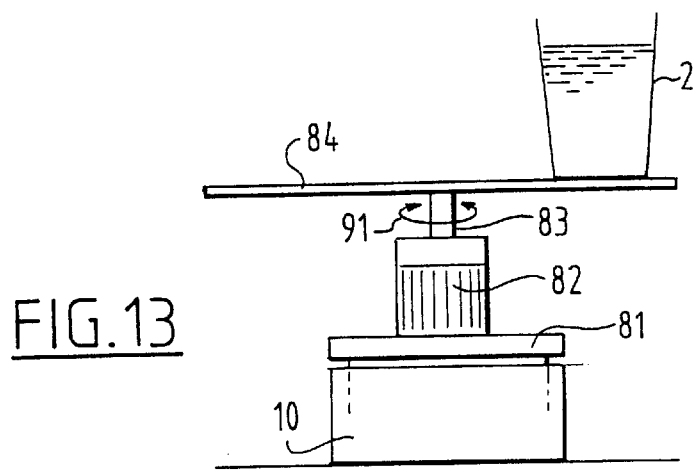
FIG. 13 is a schematic side view of yet another embodiment of the invention.

FIG. 13 shows another solution in this respect. In the configuration of FIG. 13 weighing device 10 bears a weighing platform 72 deployed solely for vertical displacement. This weighing platform 72 supports a directly driven motor 82 which, via a drive shaft 83, supports a rotatable support platform 84 on which containers 2 can be placed. In the embodiment according to FIG. 13 weighing platform 81 also supports the motor 82 which provides the rotation of support platform 84. The motor 82 and drive shaft 83 comprise a drive device of the apparatus 1. The signal processing means which process the signals generated by weighing device 10 must be embodied such that a correction can take place for the presence of a motor 82 which is also weighed by weighing device 10. As is usual during a weighing, the scales inclusive of the supporting means are set to zero value, which zero value in the case of FIG. 13 also takes account of the weight of the motor.

In FIGS. 11, 12, and 13 an arrow 91 indicates the rotation of the respective support platforms.

It is noted that the variant according to FIG. 13, wherein motor 82 is supported by weighing platform 81, can also drive support platform 84 in the manner shown in FIG. 12, therefore not directly but via a toothed geared. In the case the toothed gearing does not then have to be embodied such that during weighing the toothed wheels are mutually disengaged. Because weighing platform 81 supports both the motor and the support platform, both move up and downward together, so that there is no need to fear a force being exerted on the support platform by the motor such that the measurement could thereby be influenced.

What is claimed is:

1. An apparatus for metering a plurality of different liquid or pasty masses to receiving containers, the apparatus comprising:

first supporting means for supporting the receiving containers for the masses in fixed positions;

a fixedly disposed annular frame bearing a plurality of dispensing nozzles controllable by a fixedly disposed central control means and each individually communicatable with the receiving containers;

second supporting means controllable by the control means for supporting one of the receiving containers such that this receiving container is displaceable in an annular path corresponding with the annular form of the frame and can be placed temporarily beneath a chosen dispensing nozzle for receiving mass dispensed by this dispensing nozzle;

a weighing device on which the receiving container can be placed, wherein the weighing device is configured to supply signals to the control means which are representative for the weight of the receiving container with its content or the change in that weight;

wherein the control means are adjustable for dispensing different masses in determined quantities to successive of the receiving containers in order to make successive mixtures of respective chosen compositions;

wherein the weighing device is disposed fixedly, and wherein the weighing device is connected to the control means via at least one cable means; and wherein the second supporting means is rotatably drivable around a vertical axis by a cylindrical drive drum, around which an endless drive element is trained through a whole number of rotations, which drive element is drivable in both directions by a drive device.

2. The apparatus as claimed in claim 1, wherein the drive device comprises at least one drive cylinder.

3. The apparatus as claimed in claim 2, wherein the drive device comprises at least two cylinders connected mechanically in series to each other, the respective strokes of which correspond with respectively a diminishing fraction of a periphery of the drive drum.

4. The apparatus as claimed in claim 2, wherein the at least one drive cylinder is one of a pneumatic, hydraulic and electrical drive cylinder.

5. The apparatus as claimed in claim 1, wherein the liquid or pasty masses include paint, ink, thickening agents and thinning agents.

6. The apparatus as claimed in claim 1, wherein the control means are adjustable by program control.

7. The apparatus as claimed in claim 1, wherein the endless drive element is one of a belt, a toothed belt, a cord and a cable.

8. The apparatus as claimed in claim 1, wherein the control means are adjustable for dispensing different masses in determined quantities to successive receiving containers in successive cycles whereby successive mixtures of respective chosen compositions are made.

9. An apparatus for metering a plurality of different liquid or pasty masses to receiving containers, the apparatus comprises:

first supporting means for supporting the receiving containers for the masses in fixed positions;

a fixedly disposed annular frame bearing a plurality of dispensing nozzles controllable by a fixedly disposed central control means and each individually communicatable with the receiving containers;

second supporting means controllable by the control means for supporting one of the receiving containers such that this receiving container is displaceable in an annular path corresponding with the annular form of the frame and can be placed temporarily beneath a chosen dispensing nozzle for receiving mass dispensed by this dispensing nozzle;

a weighing device on which the receiving container can be placed, wherein the weighing device is configured to supply signals to the control means which are representative for the weight of the receiving container with its content or the change in that weight;

wherein the control means arc adjustable for dispensing different masses in determined quantities to successive of the receiving containers in order to make successive mixtures of respective chosen compositions;

wherein the weighing device is disposed fixedly and wherein the weighing device is connected to the control means via at least one cable means; and wherein the second supporting means is rotatably drivable around a vertical axis by a drive device co-acting with the second supporting means such that when weighting are performed the drive device is selectively disengaged from the second supporting means such that no forces that can influence the weighings are exerted on the second supporting means.

10. The apparatus as claimed in claim 9, wherein the second supporting means includes a toothed wheel and the drive device includes a drive toothed wheel co-acting with the toothed wheel to drive the second supporting means when weighings are not performed, wherein the drive toothed wheel is fixedly disposed, and wherein the toothed wheel of the second supporting means is movable in a vertical direction to disengage from the drive toothed wheel when the weighings are to be performed.

11. The apparatus as claimed in claim 9, wherein the liquid or pasty masses include paint, ink, thickening agents and thinning agents.

12. The apparatus as claimed in claim 9, wherein the control means are adjustable by program control.

13. The apparatus as claimed in claim 9, wherein the control means are adjustable for dispensing different masses in determined quantities to successive receiving containers in successive cycles whereby successive mixtures of respective chosen compositions are made.

14. An apparatus for metering a plurality of different liquid or pasty masses to receiving containers, the apparatus comprising:

first supporting means for supporting the receiving containers for the masses in fixed positions;

a fixedly disposed annular frame bearing a plurality of dispensing nozzles controllable by a fixedly disposed central control means and each individually communicatable with the receiving containers;

second supporting means controllable by the control means for supporting one of the receiving containers such that this receiving container is displaceable in an annular path corresponding with the annular form of the frame and can be placed temporarily beneath a chosen dispensing nozzle for receiving mass dispensed by this dispensing nozzle;

a weighing device on which the receiving container can be placed, wherein the weighing device is configured to supply signals to the control means which are representative for the weight of the receiving container with its content or the change in that weight;

wherein the control means are adjustable for dispensing different masses in determined quantities to successive of the receiving containers in order to make successive mixtures of respective chosen compositions;

wherein the weighing device is disposed fixedly, and wherein the weighing device is connected to the control means via at least one cable means; and wherein the second supporting means is rotatably drivable around a vertical axis by a drive device, with the drive device located below and operatively connected to the second supporting means, and with the weighing device located below the drive device and the second supporting means and including a weighing platform supporting the drive device and the second supporting means so that no forces that could influence the weighings are exerted on the second supporting means.

15. The apparatus as claimed in claim 14, wherein the liquid or pasty masses include paint, ink, thickening agents and thinning agents.

16. The apparatus as claimed in claim 14, wherein the control means are adjustable by program control.

17. The apparatus as claimed in claim 14, wherein the control means are adjustable for dispensing different masses in determined quantities to successive receiving containers in successive cycles whereby successive mixtures of respective chosen compositions are made.

18. The apparatus as claimed in claim 14, wherein the drive device comprises a drive motor and drive shaft operatively connected to the second supporting means.

* * * * *

UNITED STATES PATENT AND TRADEMARK OFFICE
CERTIFICATE OF CORRECTION

PATENT NO. : 6,340,030 B1  Page 1 of 1
DATED : January 22, 2002
INVENTOR(S) : Jan Gerritse It is certified that error appears in the above-identified patent and that said Letters Patent is hereby corrected as shown below:

<u>Title page, Item [54] and Column 1, line 3,</u>
Title, "MATERIALS" should read -- MASSES --.
Item [56], References Cited, FOREIGN PATENT DOCUMENTS, reference "962889" should read -- 9626889 --.
Item [57], ABSTRACT,
Line 3, "first support" should read -- a first support --.

<u>Column 1,</u>
Line 9, after "pasty masses." insert new paragraph:
-- 2. Description of the Prior Art --

<u>Column 4,</u>
Line 18, "this so as" should read -- this type so as --.

<u>Column 6,</u>
Line 12, "63, 63, 65" should read -- 63, 64, 65 --.
Line 66, "toothed geared." should read -- toothed gearing. --.
Line 66, "In the case" should read -- In this case --.

<u>Column 8,</u>
Line 28, "when weighting" should read -- when weighings --.

Signed and Sealed this

Tenth Day of September, 2002

Attest:

JAMES E. ROGAN
*Attesting Officer*   *Director of the United States Patent and Trademark Office*